(12) United States Patent
    Lin

(10) Patent No.: US 12,617,166 B2
(45) Date of Patent: May 5, 2026

(54) COMPOSITE INNER CUP AND DOUBLE-LAYER CUP MANUFACTURING METHOD

(71) Applicant: Tsai-Hui Lin, Kaohsiung City (TW)

(72) Inventor: Tsai-Hui Lin, Kaohsiung City (TW)

( * ) Notice: Subject to any disclaimer, the term of this patent is extended or adjusted under 35 U.S.C. 154(b) by 109 days.

(21) Appl. No.: 18/628,975

(22) Filed: Apr. 8, 2024

(65) Prior Publication Data

US 2025/0312983 A1    Oct. 9, 2025

(51) Int. Cl.
    B29C 45/14     (2006.01)
    B29D 22/00     (2006.01)
    B29K 705/12     (2006.01)
    B29L 31/00     (2006.01)
    B65D 81/38     (2006.01)

(52) U.S. Cl.
    CPC ...... B29D 22/003 (2013.01); B29C 45/14065 (2013.01); B29C 2045/14122 (2013.01); B29K 2705/12 (2013.01); B29L 2031/7132 (2013.01); B65D 81/3869 (2013.01); B65D 81/3874 (2013.01)

(58) Field of Classification Search
    CPC ........ B29C 45/14065; B29C 45/14336; B29C 2045/14122; B29C 2045/14467
    See application file for complete search history.

(56) References Cited

U.S. PATENT DOCUMENTS

| | | | | |
|---|---|---|---|---|
| 3,247,302 | A * | 4/1966 | Lewis | B29C 66/545 |
| | | | | 220/592.2 |
| 7,975,871 | B2 * | 7/2011 | Wnek | B29C 45/14336 |
| | | | | 220/640 |
| 2003/0029876 | A1* | 2/2003 | Giraud | B65D 81/3869 |
| | | | | 220/745 |
| 2004/0262322 | A1* | 12/2004 | Middleton | B65D 43/169 |
| | | | | 220/675 |
| 2007/0210091 | A1* | 9/2007 | Mazzarolo | B65D 15/08 |
| | | | | 220/643 |
| 2010/0147447 | A1* | 6/2010 | Mazzarolo | B29C 45/14336 |
| | | | | 156/196 |
| 2013/0341388 | A1* | 12/2013 | Maatta | B29C 45/14 |
| | | | | 425/129.1 |

FOREIGN PATENT DOCUMENTS

| | | | |
|---|---|---|---|
| CN | 102475477 | * | 12/2013 |
| GB | 2171048 | * | 8/1986 |
| TW | M639368 | U | 4/2023 |

* cited by examiner

*Primary Examiner* — Edmund H Lee
(74) *Attorney, Agent, or Firm* — Rosenberg, Klein & Lee

(57) ABSTRACT

The invention relates to a composite inner cup and double-layer cup manufacturing method. First, a metal cup body with a top convex ring is prefabricated. Then, a lower ring is placed in a mold, and the metal cup body is placed with the lower ring positioned at the bottom edge of the top convex ring. Next, an upper ring is placed on the inner side of the top convex ring. Then, upon closing the mold, the upper and lower rings are clamped. And then, injection processing is performed on the periphery of the top convex ring, so that the cup rim portion is injected and integrated with the upper and lower rings to cover the top convex ring to complete an inner cup. Finally, the outer cup and the cup rim portion of the inner cup can be combined by ultrasonic welding to form a composite double-layer cup.

6 Claims, 9 Drawing Sheets

COMPOSITE INNER CUP AND DOUBLE-LAYER CUP MANUFACTURING METHOD

BACKGROUND OF THE PRESENT INVENTION

Field of Invention

The present invention relates to a composite inner cup and double-layer cup manufacturing method, in particular to a manufacturing method of a composite double-layer cup that is used in a metal inner cup and a plastic outer cup.

Description of Related Arts

Currently, thermal cups are mostly made of plastic, stainless steel, or ceramic materials. Plastic thermal cups are not heat-resistant and easily release toxic substances when heated, making them unsuitable for tea, coffee, and other hot beverages. Stainless steel thermal cups are mostly made of double-layer cup bodies using vacuum technology, resulting in high production costs. In recent years, ceramic thermal cups have gained popularity among consumers due to their good texture, good thermal insulation effect, and non-leaching heavy metals or toxic substances when used to hold hot drinks.

Most eco-friendly and thermal insulation cups for containing high-temperature hot drinks such as hot coffee and hot tea adopt a double-layer structure, which reduces heat conduction by the distance between the inner and outer cups, allowing the temperature of the inner cup with the hot drink to be slow or unable to transfer to the outer cup held by hand, thus avoiding the situation of scalding. The main problem to be solved when using a double-layer cup is how to connect the inner and outer cups, and the next problem is how to ensure that liquid does not seep into the gap between the inner and outer cups. When the inner and outer cups are both made of plastic materials, the inner and outer cups will have different shrinkage rates after injection molding due to uneven inner and outer wall thicknesses, which will cause the problem of inaccurate matching dimensions of the inner and outer cups, thus affecting the assembly accuracy and quality of the finished double-layer cup. As a result, most plastic double-layer cups use high-frequency bonding between the inner and outer cups, or, as described in Taiwan Patent No. M639368, use a screw assembly relationship to allow the easy disassembly or combination of the inner cup and outer cup.

However, the aforementioned plastic inner cup is not heat-resistant and easily releases toxic substances when heated, and the cup body with screw disassembly cannot have good thermal insulation and isolation. Therefore, the industry is actively developing composite double-layer cups, which use a plastic ring to bond the opening end of the metal inner cup, and are fixed by combining the plastic ring and the plastic outer cup. However, this technology has the following disadvantages:

1. Complex processing procedures. The process requires the preparation of a plastic ring first, and the plastic ring needs to have a groove for the metal inner cup to fit into. Then, an adhesive that can bond with the plastic outer cup is applied to the groove, which needs to be manually bonded and fixed. This process involves multiple steps and is time-consuming and labor-intensive.

2. The metal inner cup is often used alternately between hot and cold, which can easily cause the adhesive to deteriorate or dissolve. The dissolved adhesive is harmful to the human body.

3. When the adhesive deteriorates or dissolves, gaps are formed that can easily accumulate dirt and are difficult to clean, which is not hygienic in use.

SUMMARY OF THE PRESENT INVENTION

The main purpose of the present invention is to provide a composite inner cup and double-layer cup manufacturing method, particularly a method for manufacturing a composite double-layer cup including a metal inner cup and a plastic outer cup.

The main purpose and effect of the composite inner cup and double-layer cup manufacturing method of the present invention are achieved by the following specific technical means:

it mainly prefabricates a metal cup body with a top convex ring. Then, a lower ring is placed in a mold, and the metal cup body is placed with the lower ring positioned at the bottom edge of the top convex ring. Next, an upper ring is placed on the inner side of the top convex ring. During closing of the mold, the upper and lower rings are clamped, and the top convex ring of the metal cup body is positioned by the upper and lower rings. Then, injection processing is performed on the periphery of the top convex ring of the metal cup body corresponding to the mold, so that the cup rim portion is injected and integrated with the upper and lower rings to cover the top convex ring, thereby completing the production of an inner cup. In this way, the outer cup and the cup rim portion of the inner cup are made of the same material and can be combined by ultrasonic welding to form a composite double-layer cup, which reduces the processing procedures and has the advantages and effects of being safe, non-toxic and hygienic in use.

A preferred embodiment of the composite inner cup and double-layer cup manufacturing method of the present invention, wherein the composite double-layer cup mainly includes an inner cup and an outer cup. The inner cup and the outer cup are made of different materials and combined together.

In the preferred embodiment of the present invention, the inner cup is made by the following steps: (S1) prefabricating a metal cup body, (S2) preparing a mold, (S3) placing an upper ring and a lower ring, (S4) closing the mold, and (S5) injecting molding. Afterward, the outer cup is prefabricated (S6), and the two cups are combined (S7) to form the double-layer cup.

DETAILED DESCRIPTION OF THE PREFERRED EMBODIMENT

Figure 1:
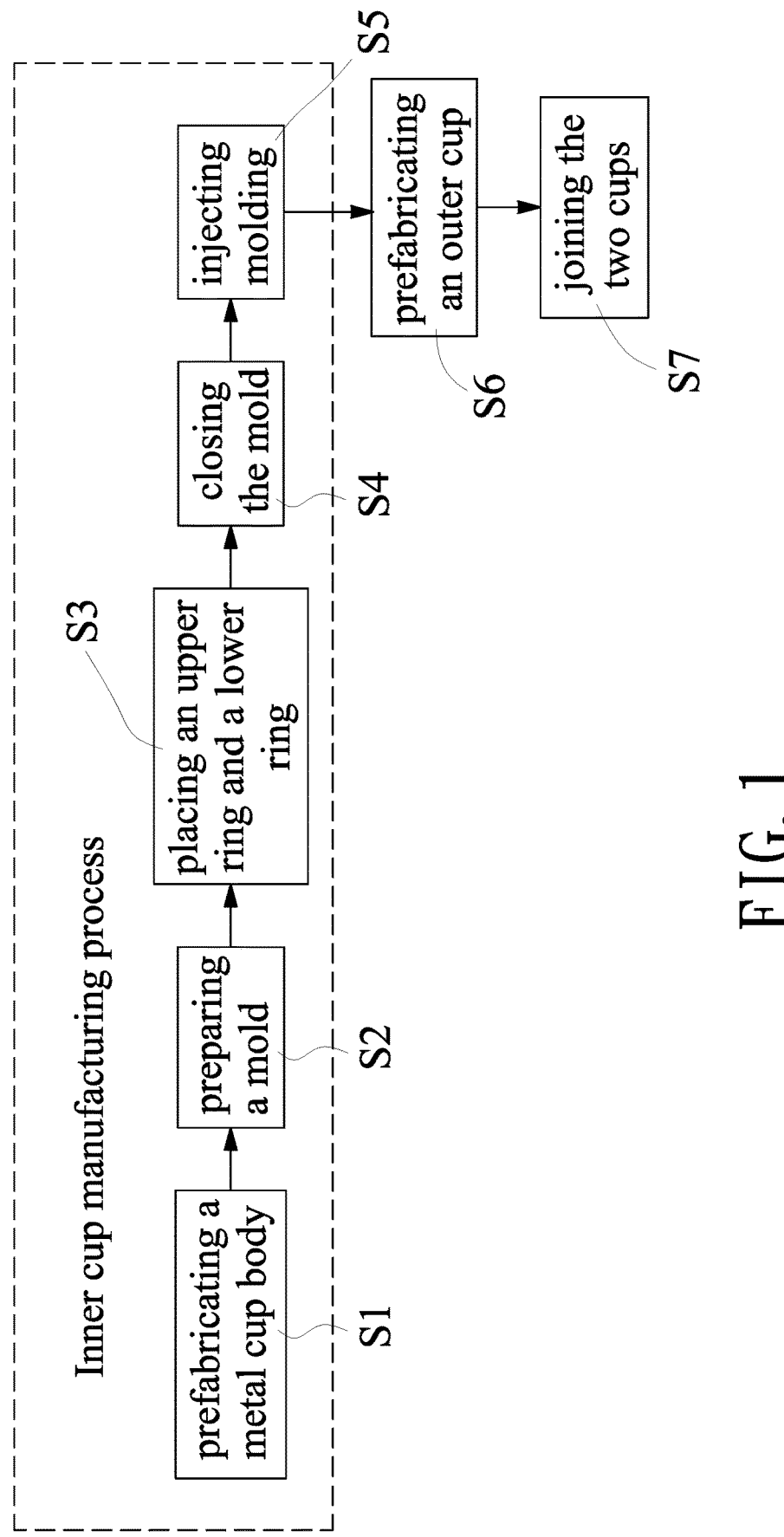
FIG. 1 is a flow diagram of the present invention.
Figure 2:
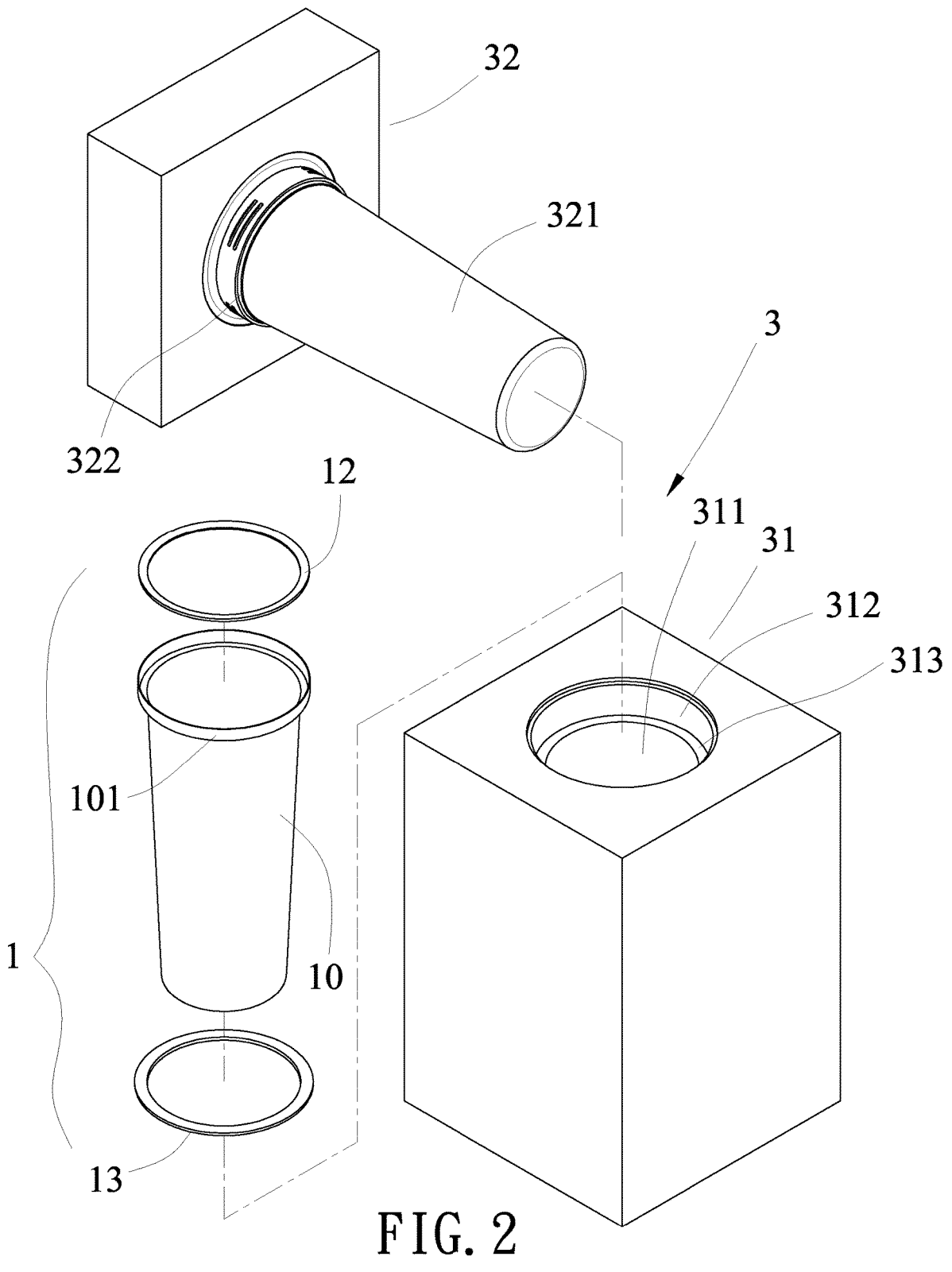
FIG. 2 is an exploded view of an inner cup and a mold structure of the present invention.
Figure 3:
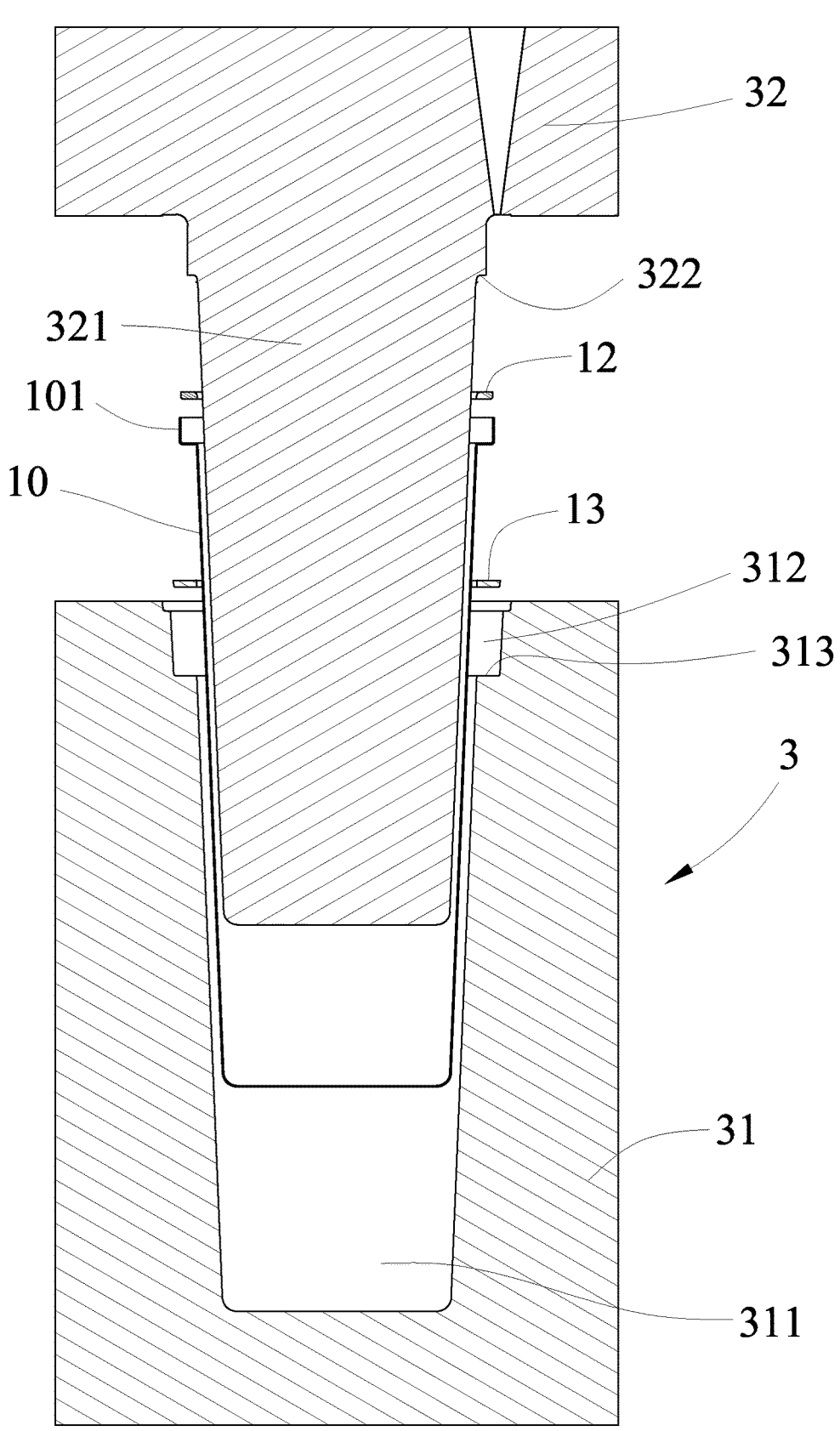
FIG. 3 is an exploded sectional view of the inner cup and the mold structure of the present invention.
Figure 4:
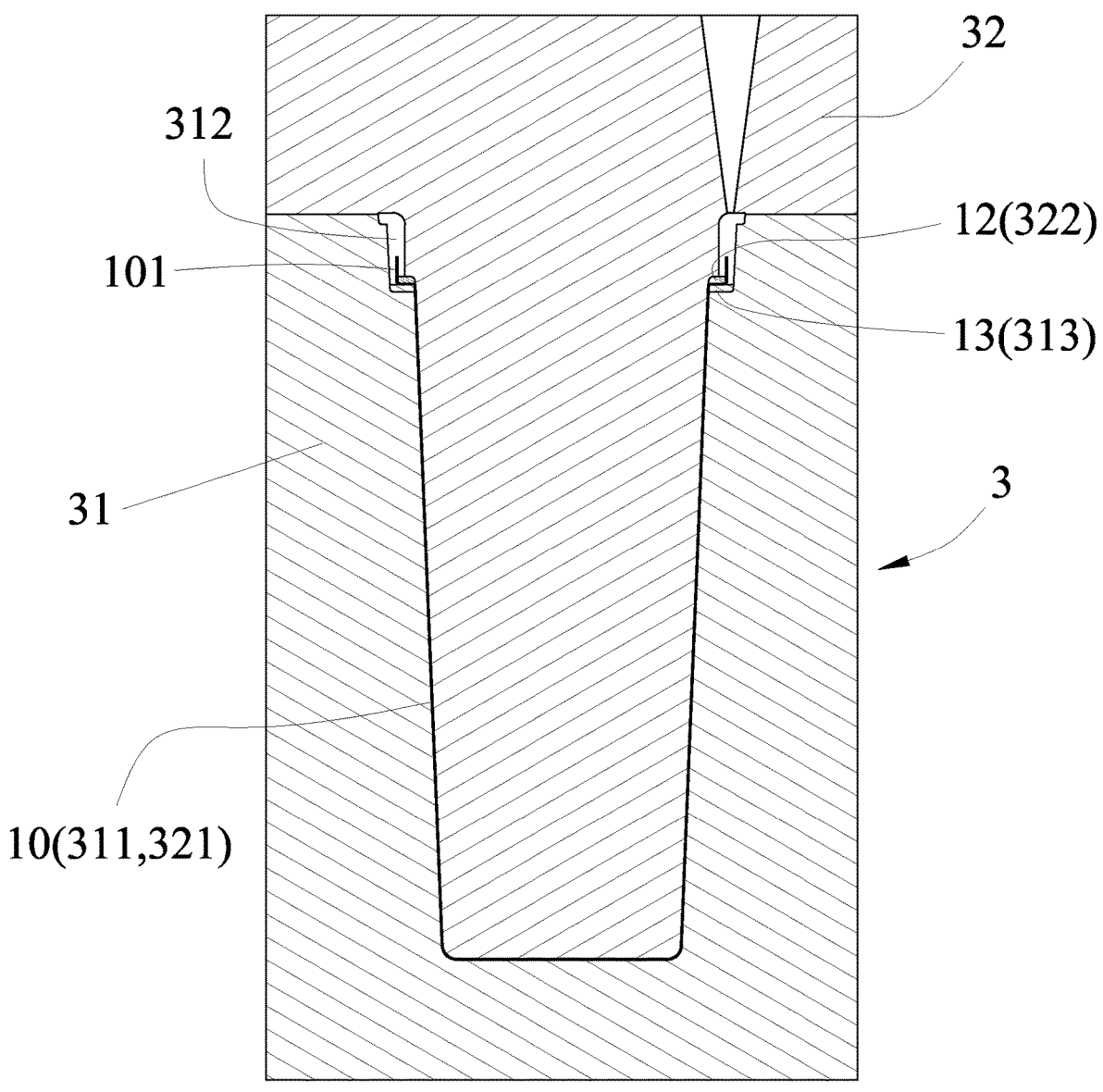
FIG. 4 is a perspective view of the step of the closing mold according to the present invention.
Figure 5:
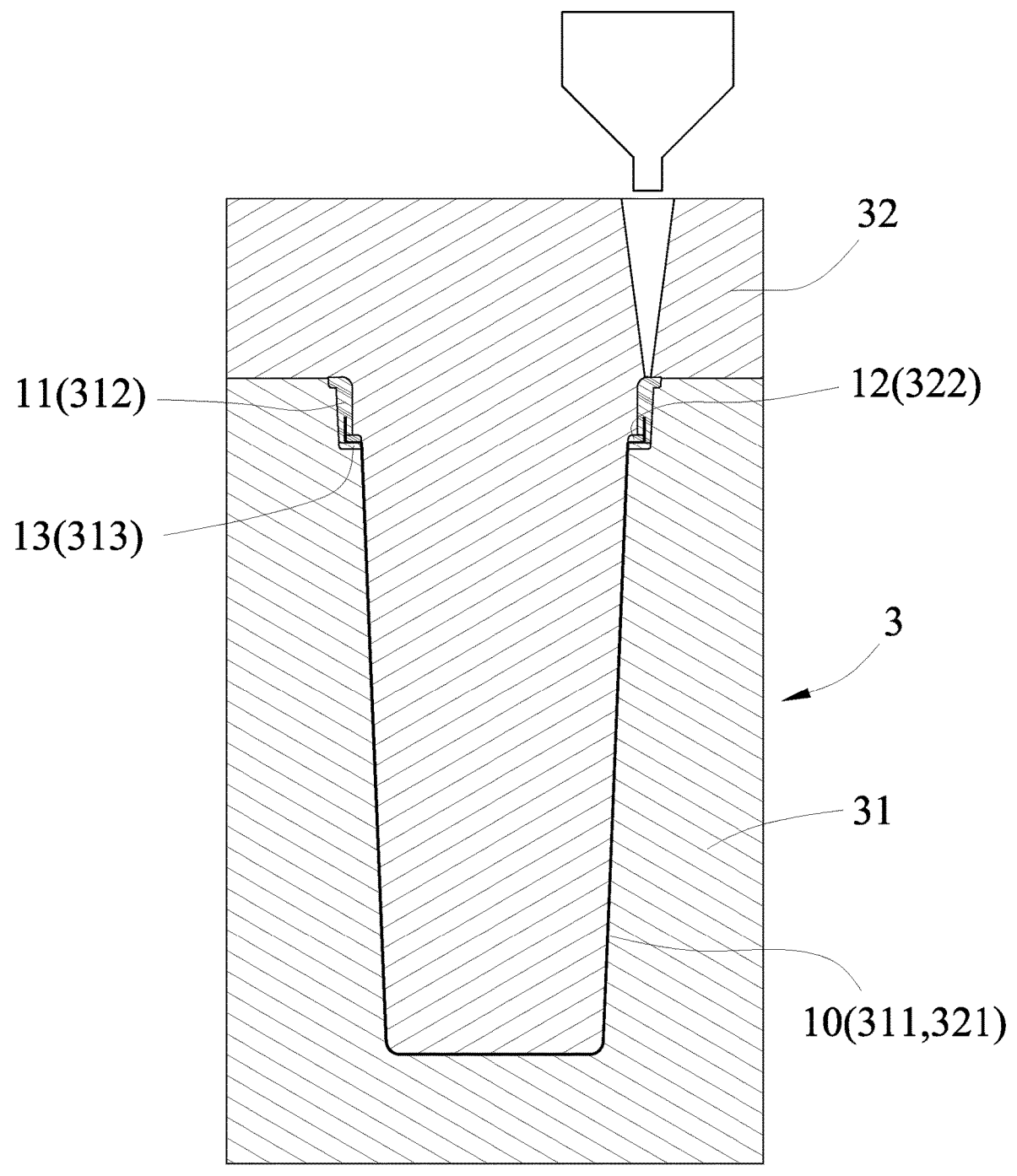
FIG. 5 is a perspective view of the step of the injecting molding according to the present invention.
Figure 6:
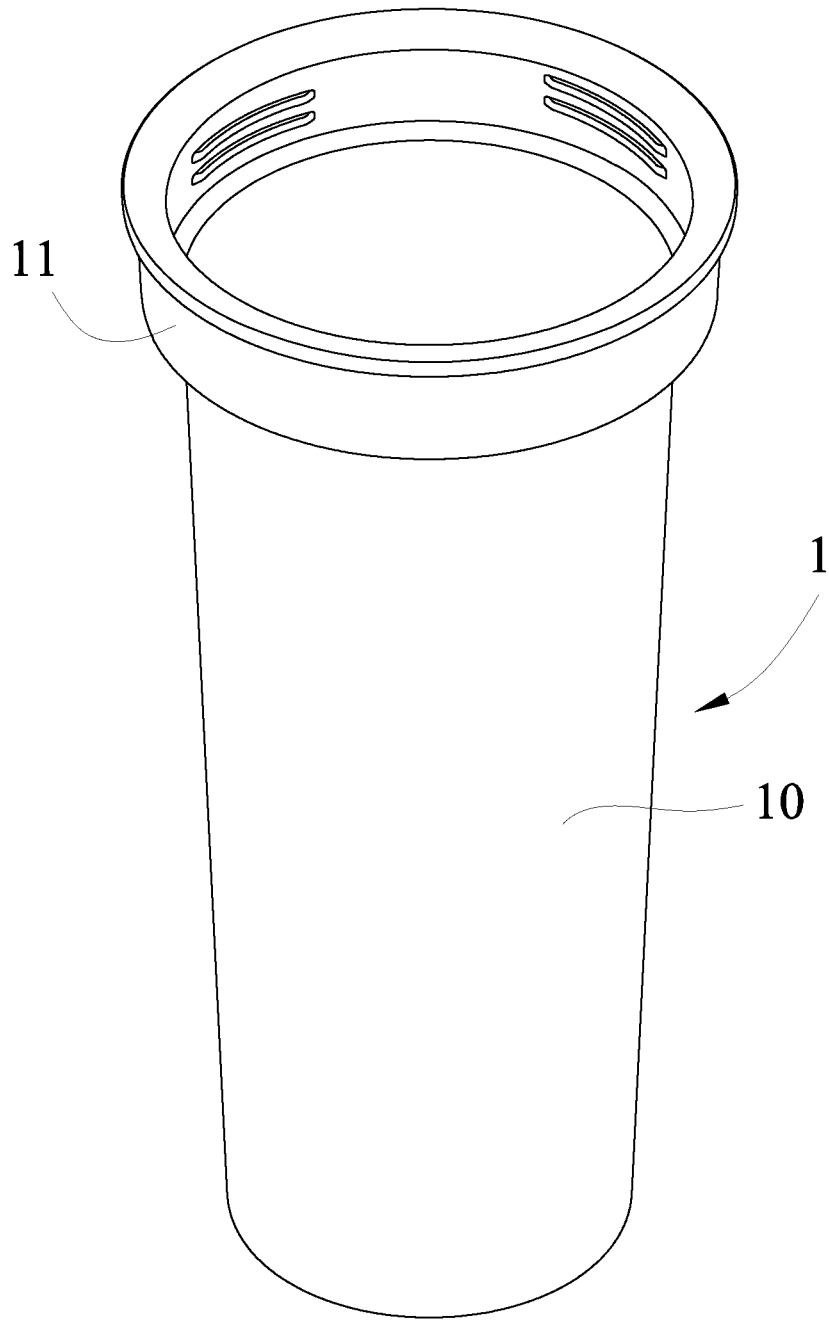
FIG. 6 is a perspective view of the appearance of the inner cup of the present invention.
Figure 8:
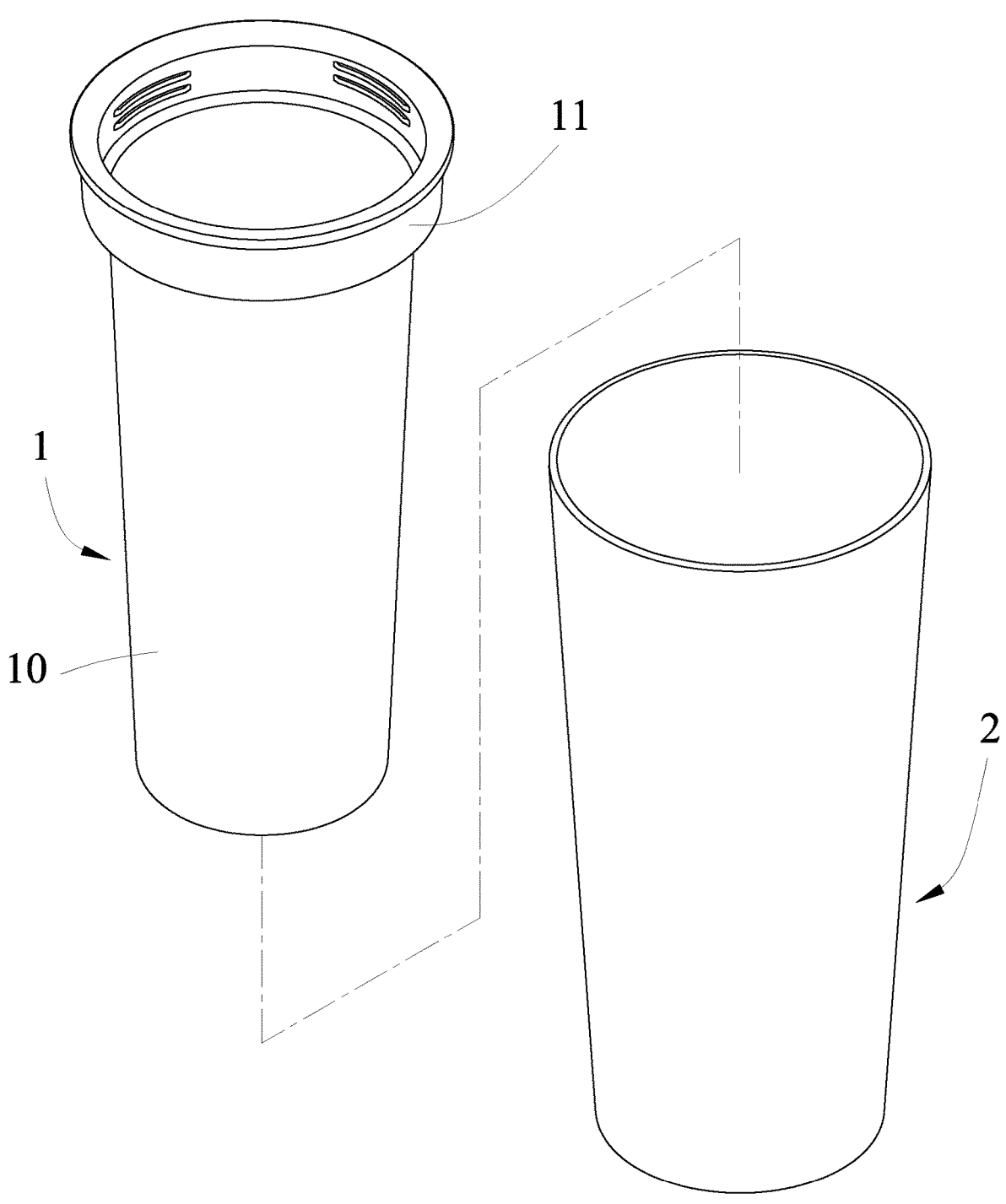
FIG. 8 is an exploded view of the inner cup and the outer cup of the present invention [prefabricated outer cup].

First, referring to FIGS. 1, 6 and 8, which are flow diagrams of a composite inner cup and a double-layer cup manufacturing method of the present invention. The composite double-layer cup mainly includes an inner cup (1) and an outer cup (2), wherein the inner cup (1) and the outer cup (2) are made of different materials and combined, wherein the inner cup (1) mainly injects and forms a cup rim portion (11) of a metal cup body (10) through a mold (3), wherein the steps include the following:

S1) prefabricating the metal cup body: prefabricating the metal cup body (10), and forming an annular top convex ring (101) at an opening of the metal cup body (10);

S2) preparing a mold: setting up a female mold (31) and a corresponding male mold (32), wherein the female mold (31) has a mold cavity (311) for holding the metal cup body (10), a cup rim space (312) forming the cup rim portion (11) is provided in the mold cavity (311) corresponding to the top convex ring (101) of the metal cup body (10), and a stepped bottom edge (313) formed between the cup rim space (312) and the mold cavity (311), wherein the male mold (32) has a module (321) arranged corresponding to the mold cavity (311), and a stepped pressing edge (322) formed on the module (321) corresponding to the cup rim space (312);

S3) placing an upper ring and a lower ring: prefabricating the upper ring (12) and the lower ring (13) made of the same material as the cup rim portion (11), wherein placing the lower ring (13) on the bottom edge (313) of the mold cavity (311), and placing the metal cup body (10) into the mold cavity (311) of the female mold (31), so that the top convex ring (101) of the metal cup body (10) is pressed against the lower ring (13), and then placing the upper ring (12) on an inner end surface of the top convex ring (101);

S4) closing the mold: closing the male mold (32) to the female mold (31) so that the pressing edge (322) of the male mold (32) is pressed against the upper ring (12); and S5) injecting molding: injecting plastic into the cup rim space (312) through injection molding, allowing the plastic to melt and fuse with the upper ring (12) and the lower ring (13) to form the cup rim portion (11), which encloses the top convex ring (101) to complete the inner cup (1) manufacturing process.

After the inner cup (1) is completed, continue to manufacture the outer cup (2). The steps are as follows:

S6) prefabricating the outer cup: using a plastic material that is different from the metal cup body (10) of the inner cup (1) to make the outer cup (2); and S7) joining the two cups: placing the inner cup (1) into the outer cup (2), and correspondingly combining the cup rim portion (11) of the inner cup (1) with the opening of the outer cup (2) to complete the production of the double-layer cup.

Referring to FIGS. 1 to 9. During actual operation, a preferred embodiment is listed below for explanation. The inner cup (1) adopts the metal cup body made of stainless steel or titanium metal material. The outer cup (2) is made of PP, PE, PA, PET and other plastic materials. In the manufacturing process of the present invention, the inner cup (1) is first produced. The primary step (S1) of the inner cup (1) is to pre-make the metal cup body (10) using the aforementioned materials, and the metal cup body (10) is forged to form the annular top convex ring (101) at the opening thereof. Furthermore, since the inner cup (1) and the outer cup (2) are made of different materials and are difficult to combine, thus the cup rim portion (11) that can be joined with the outer cup (2) is formed at the opening end of the inner cup (1). The formation of the cup rim portion (11) requires the preparation of the mold (3) in step (S2). The mold (3) includes the female mold (31) and the male mold (32). The shape of the inner cup (1) is constructed within the mold (3), where a mold cavity (311) for accommodating the metal cup body (10) is constructed within the female mold (31). Correspondingly, the male mold (32) has the module (321) that corresponds to the mold cavity (311). The cup rim space (312) forming the cup rim portion (11) is made in the mold cavity (311). The stepped bottom edge (313) is formed between the cup rim space (312) and the mold cavity (311). The module (321) forms the stepped pressing edge (322) corresponding to the cup rim space (312).

Before inserting the metal cup body (10) into the mold (3), the lower ring (13) is placed at the bottom edge (313) of the mold cavity (311). The lower ring (13), made of the same material as the cup rim portion (11), is pre-manufactured. Then, the metal cup body (10) is placed into the mold cavity (311) of the female mold (31) to allow the top convex ring (101) of the metal cup body (10) to press against the lower ring (13). And then, the upper ring (12) is placed on the inner end surface of the top convex ring (101). The upper ring (12), made of the same material as the cup rim portion (11), is also pre-manufactured. This completes step (S3). Subsequently, during the injection molding process, the male mold (32) is aligned with the female mold (31) to complete the closing the mold step (S4), thereby enabling the pressing edge (32) to press against with the upper ring (12).

Figure 7:
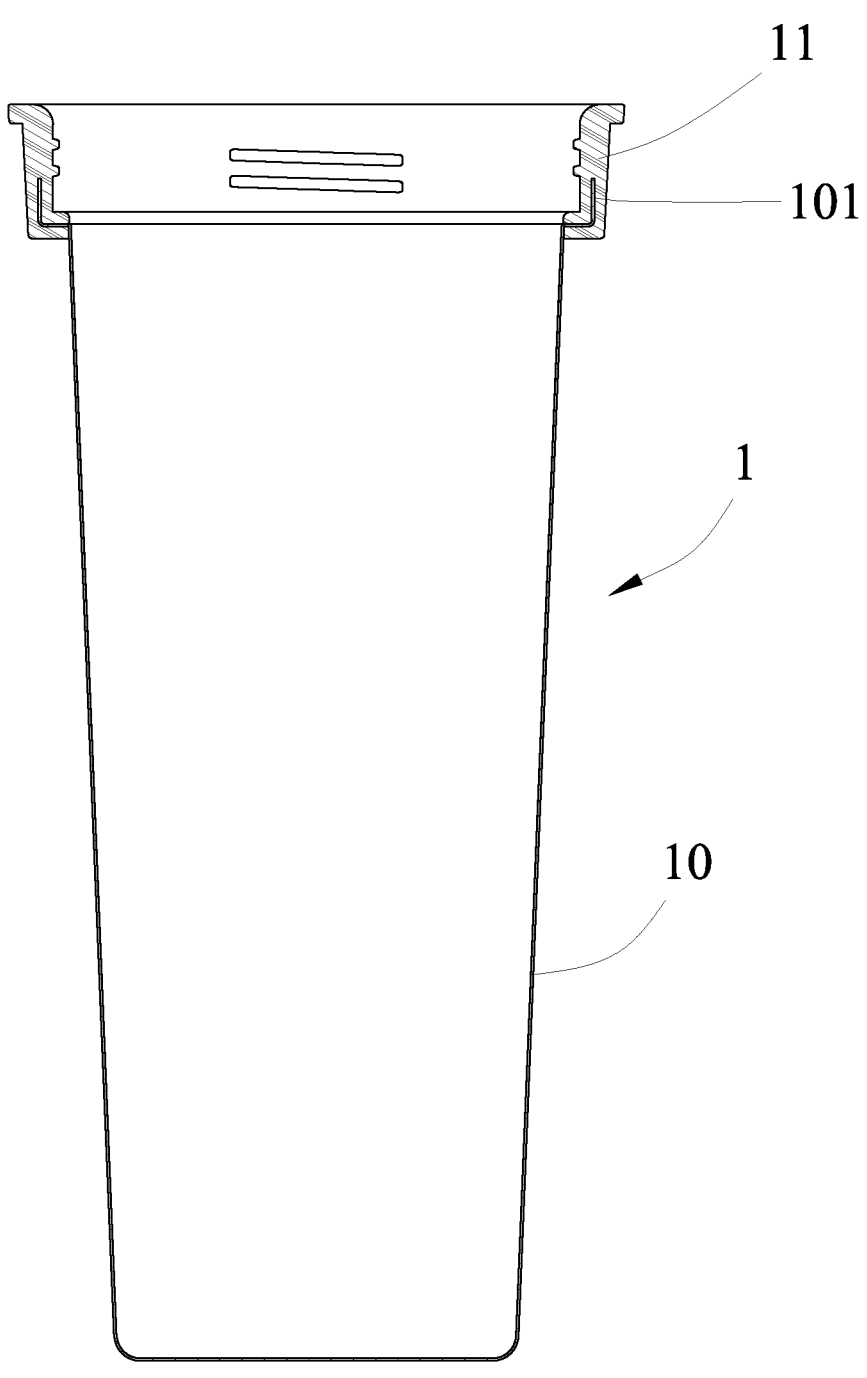
FIG. 7 is a sectional view of the inner cup of the present invention.

After mold closing, step (S5) is performed, where plastic is injected into the cup rim space (312) through injection molding technology. The plastic, in a high-temperature molten state, fuses with the upper ring (12) and the lower ring (13) to form the cup rim portion (11), which wraps around the top convex ring (101) of the metal cup body (10). After demolding, the inner cup (1) is completed [as shown in FIGS. 6 and 7].

Figure 9:
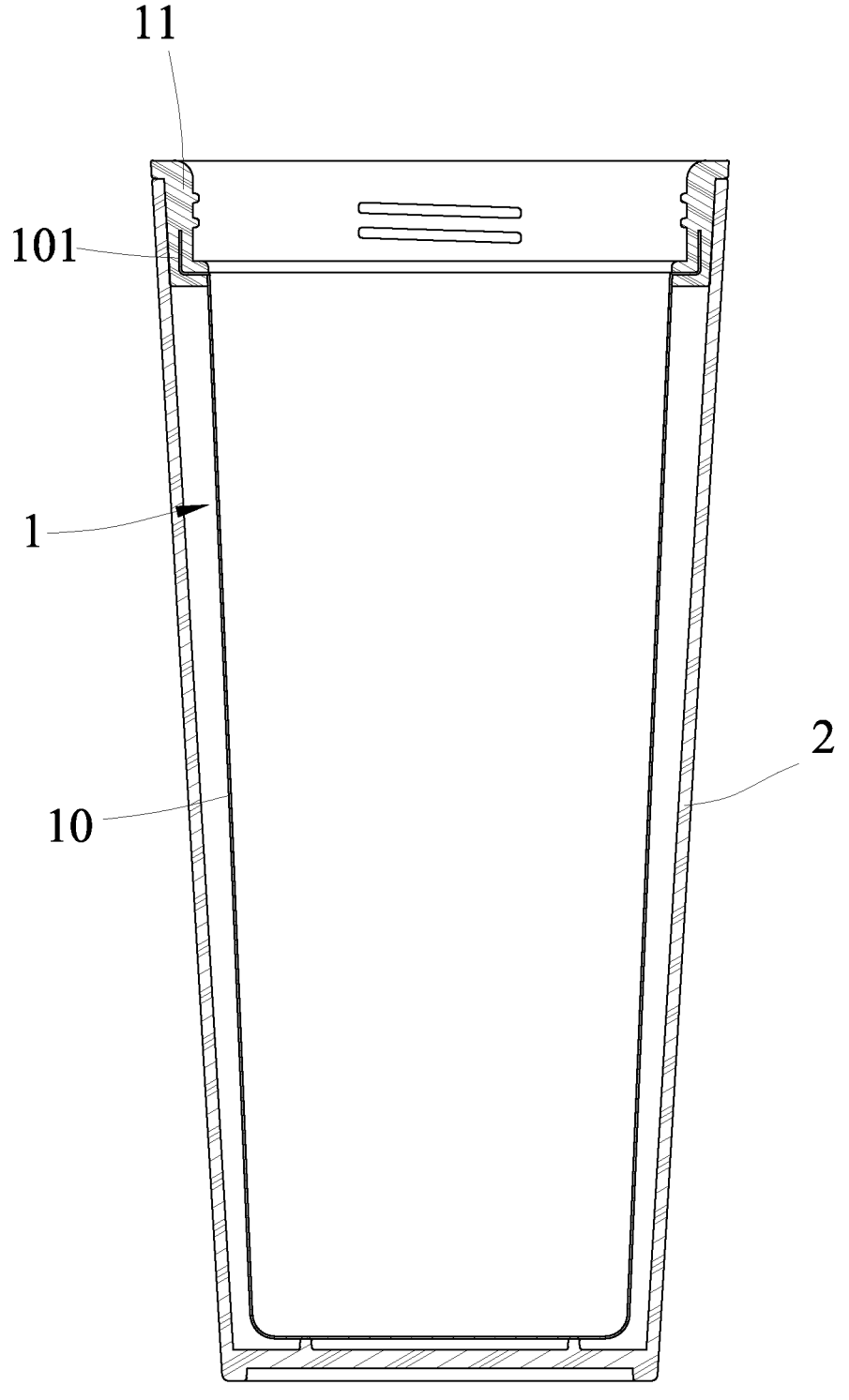
FIG. 9 is a sectional view of the step of joining the two cups according to the present invention.

The opening end of the completed inner cup (1) has the cup rim portion (11) made of the same material as the outer cup (2), allowing the cup rim portion (11) to correspond and join with the outer cup (2). In step (S6), the outer cup (2) is prefabricated. The outer cup (2) and the metal cup body (10) of the inner cup (1) are made of different materials, and the outer cup (2) is made of plastic material. Then, the inner and outer cups are combined, and in step (S7), the inner cup (1) is placed into the outer cup (2), and the cup rim portion (11) of the inner cup (1) is joined with the corresponding opening of the outer cup (2). Both the outer cup (2) and the cup rim portion (11) of the inner cup (1) are made of plastic material and can be joined by ultrasonic welding, allowing the inner cup (1) and the outer cup (2) to be combined to complete the production of the composite double-layer cup [as shown in FIG. 9].

The method of the present invention has the following advantages:

1. The inner cup and double-layer cup manufacturing method of the present invention allows directly cover the cup rim portion through injection processing through the design of the upper and lower rings, without the need for manual gluing and assembly, thereby reducing processing procedures, labor resources, costs, and other benefits.

2. The inner cup and double-layer cup manufacturing method of the present invention, as mentioned above, does not require glue, providing the advantages of safety, non-toxicity, and hygiene.

3. The inner cup and double-layer cup manufacturing method of the present invention, through the design of the upper and lower rings, ensures that during mold closing, the pressing edge of the male mold presses against the upper ring, while the metal cup body exerts pressure against the lower ring. The mold closing pressure falls on the upper and lower rings, and there will be no leakage problems due to deformation of the metal cup body and poor tightness in the future.

What is claimed is:

1. A composite inner cup manufacturing method, mainly by injecting a cup rim portion of a metal cup body using a mold, comprising the steps of:

S1) prefabricating the metal cup body: prefabricating the metal cup body, and forming an annular top convex ring at an opening of the metal cup body;

S2) preparing a mold: setting up a female mold and a corresponding male mold, wherein the female mold has a mold cavity for holding the metal cup body, a cup rim space forming the cup rim portion is provided in the mold cavity corresponding to the top convex ring of the metal cup body, and a stepped bottom edge formed between the cup rim space and the mold cavity, wherein the male mold has a module arranged corresponding to the mold cavity, and a stepped pressing edge formed on the module corresponding to the cup rim space;

S3) placing an upper ring and a lower ring: prefabricating the upper ring and the lower ring, wherein placing the lower ring on the bottom edge of the mold cavity, and placing the metal cup body into the mold cavity of the female mold, so that the top convex ring of the metal cup body is pressed against the lower ring, and then placing the upper ring on an inner end surface of the top convex ring;

S4) closing the mold: closing the male mold to the female mold so that an underside of the top convex ring of the metal cup body is pressed against the lower ring and the upper ring is placed on an inner end surface of the top convex ring; and S5) injecting molding: injecting plastic into the cup rim space through injection molding, allowing the plastic to melt and fuse together with the upper ring placed on the inner end surface of the top convex ring and the lower ring pressed against the underside of the top convex ring of the metal cup body, thereby integrally forming the cup rim portion, which encloses both the inner end surface and an outer side of the top convex ring.

2. The composite inner cup manufacturing method as claimed in claim 1, wherein the upper ring, the lower ring, and the cup rim portion are made of the same material.

3. A composite double-layer cup manufacturing method, comprising the steps of:

S1) prefabricating the metal cup body: prefabricating the metal cup body, and forming an annular top convex ring at an opening of the metal cup body;

S2) preparing a mold: setting up a female mold and a corresponding male mold, wherein the female mold has a mold cavity for holding the metal cup body, a cup rim space forming the cup rim portion is provided in the mold cavity corresponding to the top convex ring of the metal cup body, and a stepped bottom edge formed between the cup rim space and the mold cavity, wherein the male mold has a module arranged corresponding to the mold cavity, and a stepped pressing edge formed on the module corresponding to the cup rim space;

S3) placing an upper ring and a lower ring: prefabricating the upper ring and the lower ring, wherein placing the lower ring on the bottom edge of the mold cavity, and placing the metal cup body into the mold cavity of the female mold, so that the top convex ring of the metal cup body is pressed against the lower ring, and then placing the upper ring on an inner end surface of the top convex ring;

S4) closing the mold: closing the male mold to the female mold so that an underside of the top convex ring of the metal cup body is pressed against the lower ring and the upper ring is placed on an inner end surface of the top convex ring;

S5) injecting molding: injecting plastic into the cup rim space through injection molding, allowing the plastic to melt and fuse together with the upper ring placed on the inner end surface of the top convex ring and the lower ring pressed against the underside of the top convex ring of the metal cup body, thereby integrally forming the cup rim portion, which encloses both the inner end surface and an outer side of the top convex ring to complete an inner cup;

S6) prefabricating an outer cup: using a plastic material that is different from the metal cup body of the inner cup to make the outer cup; and S7) joining the two cups: placing the inner cup into the outer cup, and correspondingly combining the cup rim portion of the inner cup with the opening of the outer cup to complete the double-layer cup.

4. The composite double-layer cup manufacturing method as claimed in claim 3, wherein the upper ring, the lower ring and the cup rim portion are made of the same material.

5. The composite double-layer cup manufacturing method as claimed in claim 3, wherein the outer cup and the cup rim portion of the inner cup are made of the same material.

6. The composite double-layer cup manufacturing method as claimed in claim 3, wherein the outer cup and the cup rim portion of the inner cup are combined by ultrasonic welding.

* * * * *